(12) United States Patent
Vidal et al.

(10) Patent No.: US 11,047,533 B2
(45) Date of Patent: Jun. 29, 2021

(54) STRIP LIGHTING LED CONVERSION SYSTEM

(71) Applicant: GREEN CREATIVE, LTD, Hong Kong (CN)

(72) Inventors: Guillaume Vidal, Mende (FR); Zhang Yulin, Shanghai (CN)

(73) Assignee: Green Creative Ltd., Hong Kong (CN)

( * ) Notice: Subject to any disclaimer, the term of this patent is extended or adjusted under 35 U.S.C. 154(b) by 794 days.

(21) Appl. No.: 15/932,462

(22) Filed: Feb. 28, 2018

(65) Prior Publication Data

US 2018/0274735 A1   Sep. 27, 2018

Related U.S. Application Data

(60) Provisional application No. 62/601,428, filed on Mar. 21, 2017.

(51) Int. Cl.

| F21K 9/275 | (2016.01) |
|---|---|
| F21K 9/64 | (2016.01) |
| F21V 21/02 | (2006.01) |
| F21V 23/00 | (2015.01) |
| F21Y 103/00 | (2016.01) |
| F21Y 115/10 | (2016.01) |

(52) U.S. Cl.
CPC .............. *F21K 9/275* (2016.08); *F21K 9/64* (2016.08); *F21V 21/025* (2013.01); *F21V 23/008* (2013.01); *F21Y 2103/00* (2013.01); *F21Y 2115/10* (2016.08)

(58) Field of Classification Search
CPC ...... F21V 21/025; F21V 23/008; F21K 9/275; F21K 9/64; F21Y 2115/10; F21Y 2103/00; Y02B 2/03
See application file for complete search history.

(56) References Cited

U.S. PATENT DOCUMENTS

| 2,304,480 | A | * | 12/1942 | Schramm | E04B 9/32 |
|---|---|---|---|---|---|
| | | | | | 248/343 |
| 2,916,250 | A | * | 12/1959 | Wolar | F21V 21/03 |
| | | | | | 248/345 |
| 4,638,970 | A | * | 1/1987 | Phelan | F21V 21/04 |
| | | | | | 248/323 |
| 5,353,211 | A | * | 10/1994 | Merko | F21S 8/00 |
| | | | | | 362/232 |
| 6,045,241 | A | * | 4/2000 | Pahl | F21S 8/02 |
| | | | | | 362/147 |
| 2017/0045209 | A1 | * | 2/2017 | Schubert | F21V 21/14 |

* cited by examiner

*Primary Examiner* — Zheng Song
(74) *Attorney, Agent, or Firm* — James A. Gavney Jr.; JAG Patent Services

(57) ABSTRACT

The present invention is directed to an LED strip light conversion system for converting fluorescent strip light fixtures to LED strip light fixtures. The system includes a set of adjustable installation clip members. Each of the adjustable installation clip members includes an L-shaped slide plate and a clip structure that is slidably couple to a bottom portion of the L-shaped slide plate. The LED strip light conversion system also includes an LED strip light unit. The adjustable installation clip members are used to attach and secure the LED strip light unit to existing strip light housing having a range of widths or dimensions.

9 Claims, 5 Drawing Sheets

STRIP LIGHTING LED CONVERSION SYSTEM

RELATED APPLICATION

This application claims priority under 35 U.S.C. § 119(e) from the co-pending U.S. provisional patent application Ser. No. 62/601,428, filed on Mar. 21, 2017, and titled "STRIP LIGHTING LED CONVERSION SYSTEM." The provisional patent application Ser. No. 62/601,428, filed on Mar. 21, 2017, and titled "STRIP LIGHTING LED CONVERSION SYSTEM" is hereby incorporated by reference.

FIELD OF THE INVENTION

This invention related to lighting. More specifically, this invention related to a system strip lighting LED conversions system

BACKGROUND OF THE INVENTION

Strip lighting fixtures are commonly installed on the ceiling of work spaces. The strip lighting fixtures often use ballasts and fluorescent lighting tubes. Generally, it is cheaper to convert or retro-fit fluorescent tube strip lighting fixtures to accommodate LED lighting tubes, rather than replace entire strip lighting fixtures. There are number of retro-fit kits available to covert fluorescent tube strip lighting fixtures to LED tube strip lighting fixtures. However, many of these available kits are time consuming, or do not accommodate for variations in dimensions of existing strip lighting housings from the strip lighting fixtures that are being converted.

SUMMARY OF INVENTION

The present invention is directed to an LED strip light conversion system. The system includes a set of adjustable installation clip members. Each of the adjustable installation clip members includes an L-shaped slide plate with a hook or lip structure that extends upward in a perpendicular fashion up from a bottom portion of the L-shaped slide plate. Each adjustable installation clip member further includes a monolithic clip structure that is slidably coupled to the bottom portion of the L-shaped slide plate. The monolithic clip structure is secured to the bottom portion of the L-shaped slide plate structure through a threaded lock screw passing through a base portion the clip structure that coupled to the bottom portion of the L-shaped slide plate. The clip structure include a back plate that extends upward in a perpendicular fashion up from the base portion the clip structure and is substantially parallel with the hook or lip structure. The clip stricture further includes an spring arm that extend upward from the base portion of the clip structure and is capable of being displaced away from the back plate structure.

In operation, at least two adjustable installation clip members are attached to a first elongated edge of an existing elongated rectangular strip light housing. The adjustable installation clip members are attached such that a portion of the first elongated edge is sandwiched between the back plates and the spring arms of the two adjustable installation clip members with the hook or lip structures extending upward and outward from the first elongated edge. The two adjustable installation clip members are the preferably secured to the first elongated edge by placing two securing devices, such as threaded screws through holes in the back plated of the adjustable installation clip members and through the portions of the elongated edge that are sandwiched between the back plates and the spring arms.

An LED strip light unit is then provide with an elongated L-shaped protruding edge extending from a first inner elongated surface of the LED strip light unit. The L-shaped protruding edge of the LED strip light unit has an elongated inner hanger edge for hanging the LED strip light unit from the or lip structures of the adjustable installation clip members that are attached to a first elongated edge of the elongated rectangular strip light housing. With the LED strip light unit in the hanging position, the LED strip light unit is properly wired through existing electrical connections.

The LED strip light unit is equipped with at least two adjustable installation clip members attached to an inner elongated surface that is opposed to the elongated L-shaped protruding edge. The adjustable installation clip members are adjusted, such that with the LED strip light unit butted up to the second and opposed elongated edged of the elongated rectangular strip light housing, portions of the second and opposed elongated edge will become sandwiched between the back plates and the spring arms of the adjustable installation clip members that are attached to the LED strip light unit. With the LED strip light unit in the closed position, two adjustable installation clip members that are attached to the strip light unit are secured to the second and opposed elongated edge by placing securing devices, such as threaded screws, through holes in the back plates of the adjustable installation clip members and through the portions of the second and elongated edge that are sandwiched between the back plates and the spring arms.

DETAILED DESCRIPTION OF THE INVENTION

Figure 1A:
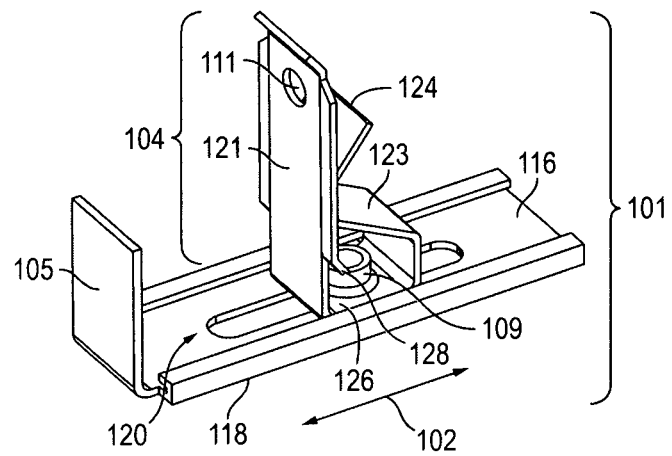
FIGS. 1A-C show schematic representations of an adjustable installation clip member used to install a strip light LED conversion system of the present invention.
Figure 1B:
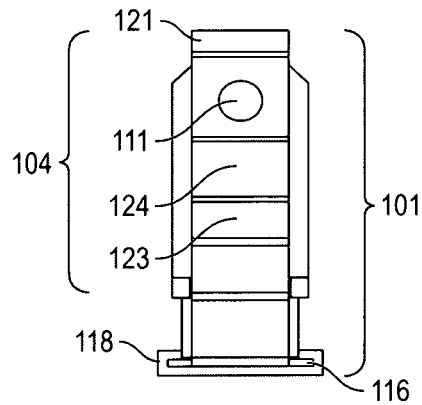
Figure 1C:
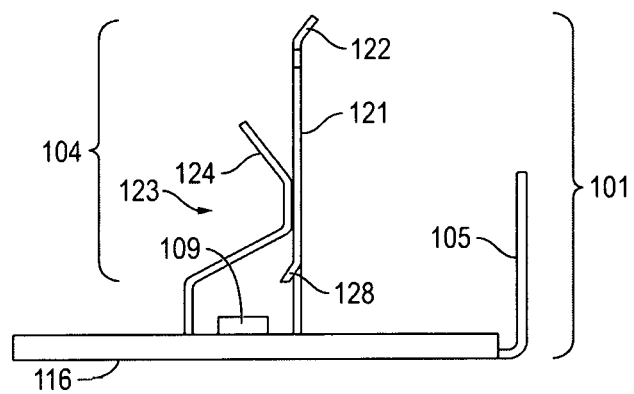

FIGS. 1A-C show schematic representations of an adjustable installation clip member 101 used to install a strip light LED conversion system of the present invention. Strip lights generally refer to elongated rectangular light fixtures that are mounted to or suspended from a ceiling or wall structure. The installation clip member 101 used in the strip light LED conversion system of the present invention includes a L-shaped slide plate 116 that can be secured within a sleeve 118. The L-shaped slide plate 116 has hook or lip structure 105 that extends upward in a perpendicular fashion up from a bottom portion 120 of the L-shaped slide plate 116. The hook or lip structure 105 is used to hang an LED strip light unit 304 (FIGS. 3B-C) from an elongated rectangular strip light housing 204 (FIGS. 2A-B and 204 FIG. 3C). The installation clip member 101 also includes a clip structure 104.

The clip structure 104 includes a back plate 121 that extends upward in a perpendicular fashion up from a base portion 126 of the clip structure 104 and the bottom portion 120 of the L-shaped slide plate 116 and is substantially parallel with the hook or lip structure 105. The back plate 121 includes a guide bend 122 at the top of the back plate 121 and a stop bend 128 near the bottom of the back plate 121. The clip structure 104 also includes a spring arm 123 that extend upward from base portion 126 of the clip structure 104. The spring arm 123 has a guide bend 124 and is capable of being displaced away from the back plate structure 121 in order to sandwiched a portion of an elongated edge 208 of the elongated rectangular strip light housing 204 (FIG. 2A) therebetween, such as described below. The back plate 121 also includes a screw hole 111 to receive a threaded screw member 131 (FIG. 1D), such as described below.

The back plate 121 and the spring arm 123 are monolithic and connected through the base portion 126 of the clip structure 104. The clip structure 104 is secured to the bottom portion 120 of the L-shaped slide plate structure 116 through a threaded lock screw 109. In operation the threaded lock screw 109 is loosened and the clip structure 104 is moved relative to the L-shaped slide plate 116, as indicated by the arrow 102, to a desired position and then the threaded lock screw 109 is tightened to secured and to hold the clip structure 104 in the desired position on the bottom portion 120 of the L-shaped slide plate 116. In this way, adjustable installation clip members can be adjusted covert fluorescent strip light fixtures having a range of housing widths $W_1$ into LED strip light fixtures.

Figure 1D:
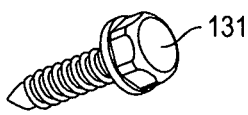
FIG. 1D shows a view of threaded screw member used to secure adjustable installation clip members, such as the adjustable installation clip member shown in FIGS. 1A-C, to a strip light housing or an LED strip light engine, in accordance with the embodiments of the invention.
Figure 2A:
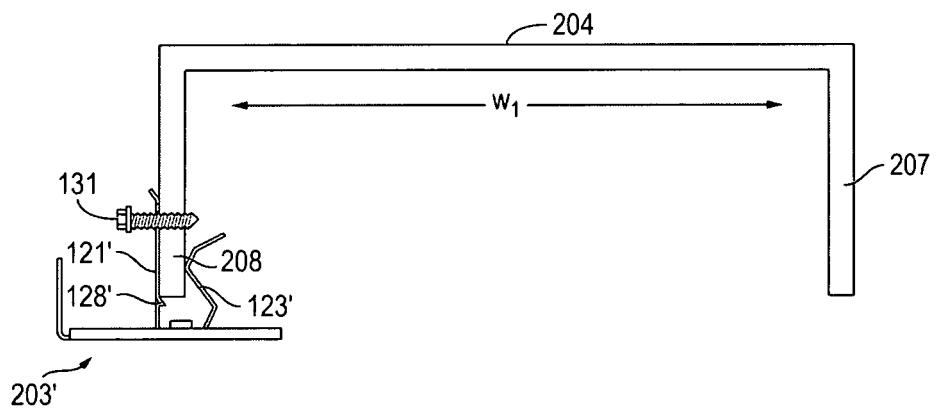
FIGS. 2A-B show views of adjustable installation clip members, such as the adjustable installation clip member shown in FIGS. 1A-C, attached to a strip light housing, in accordance with the embodiments of the invention.
Figure 2B:
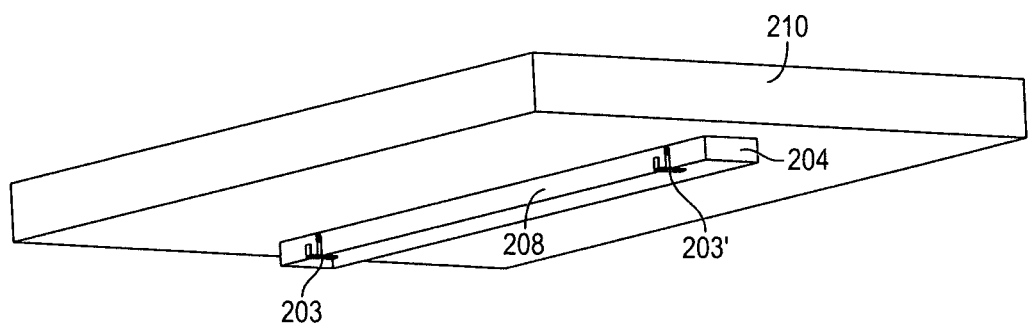
Figure 3A:
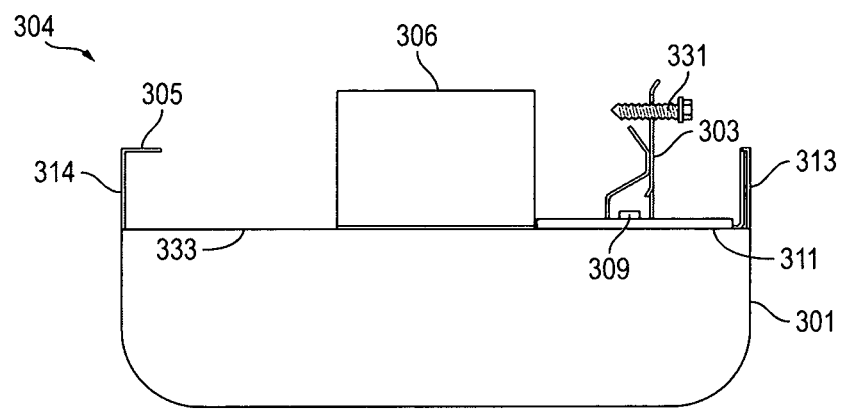
FIGS. 3A-B show views of an adjustable installation clip members, such as the adjustable installation clip member shown in FIGS. 1A-C, attached to an LED strip light unit, in accordance with the embodiments of the invention.
Figure 3B:
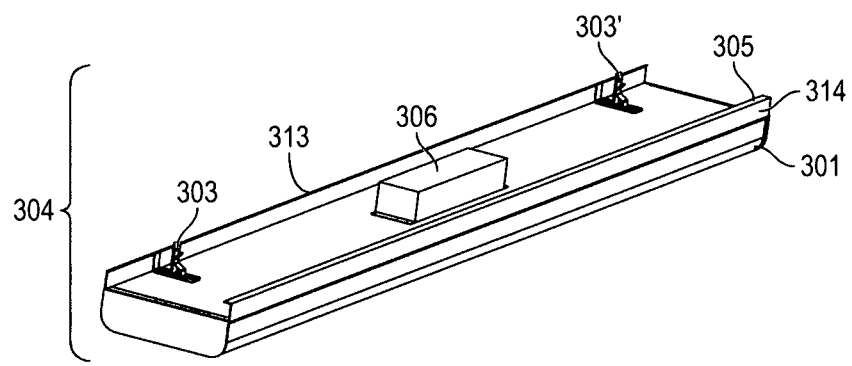

FIG. 1D shows a view of the threaded screw member 131 that is used to secure adjustable installation clip members, such as the adjustable installation clip member 101, shown in FIGS. 1A-C, and the adjustable installation clip members 203 and 203' (FIGS. 2A-B), to a strip light housing 204 (FIG. 2A) or LED strip light unit 304 (FIGS. 3A-B). While the invention is described, herein, as using threaded screw members from attaching adjustable installation clip members to strip light housings, any number of attachment means are contemplated including, but not limited to, screws, bolts, pins, snap and clip features.

Referring to FIG. 2A, in operation an existing fluorescent strip light is disassembled leaving an existing elongated rectangular strip light housing 204, hereafter referred to as strip light housing, with two opposed elongated edges 207 and 208 separated by a width $W_1$. Then an adjustable installation clip member 203', such as the adjustable installation clip member 101 (FIGS. 1A-C), is pressed up onto one of the elongated edges 208 of the existing strip light housing 204 until an end of the elongated edge 208 touches the stop bend 128' and a portion of the elongated edge 208 is sandwiched between a back plate 121' and an spring arm 123' of the adjustable installation clip member 203'. The adjustable installation clip member 203' is then secured to the elongated edge 208 of the strip light housing 204, as shown, by tapping the threaded screw member 131 through the screw hole 111 (FIG. 1A) on the back plate 121' of the adjustable installation clip member 203', as shown.

FIG. 2B, shows the strip light housing 204 mounted or suspend from ceiling or wall structure 210. In order to properly install the strip light LED conversion system of the present invention, at least two adjustable installation clip members 203 and 203' are pressed up onto the elongated edge 208 of the strip light housing 204 and secured to the strip light housing 204, such as described in detail above with reference to FIG. 2A.

FIGS. 3A-B show views of adjustable installation clip members 303 and 303', such as the adjustable installation clip member 101, shown in FIGS. 1A-C attached, to an LED strip light unit 304. The LED strip light unit 304 includes an LED light engine 301 that is electrically coupled to an LED driver circuit 306.

In operation, the adjustable installation clip members 303 and 303' are attached to an inside top surface 311 of the LED strip light unit 304 through, for example, threaded lock screw 309. There is a an L-shaped protruding edge 314 with an hanger edge 305 that extends upward from the opposed top inner surface 333 of the LED strip light unit 304, as shown. The LED strip light unit 304 equipped with the adjustable installation clip members 303 and 303' installed as described is then used complete the conversion of a fluorescent strip light fixture to an LED strip light fixture.

Figure 3C:
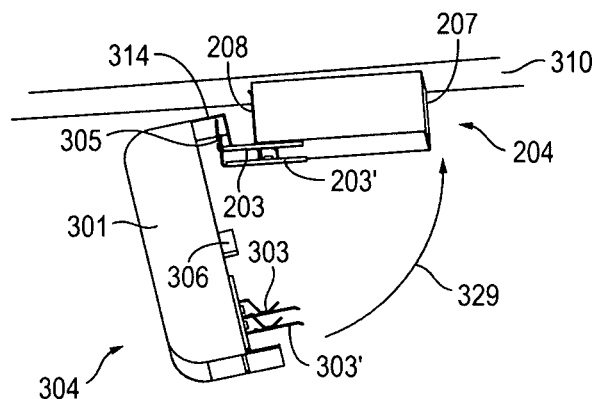
FIGS. 3C-D show an LED strip light engine, such as the LED strip light unit shown in FIGS. 3A-B, hanging from the strip light housing through adjustable installation clip members attached to a strip light housing.
Figure 3D:
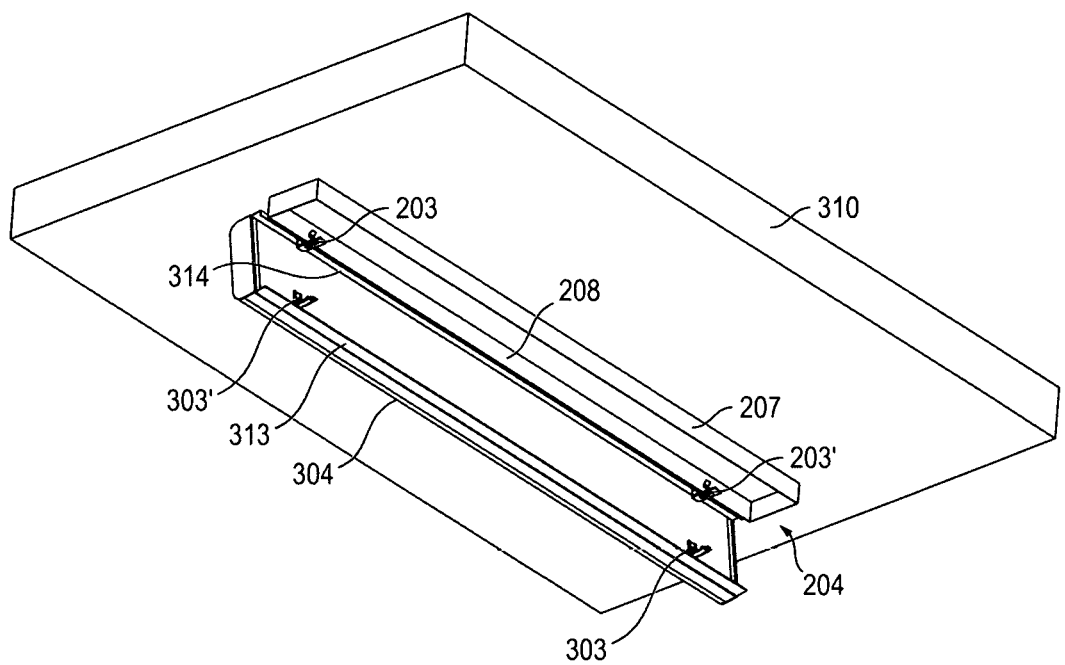

Referring now to FIGS. 3C-D, the LED strip light unit 304, such as the LED strip light unit 304 shown in FIGS. 3A-B is hung onto the two adjustable installation clip members 203 and 203' attached to the elongated edge 208 of the strip light housing 204. The strip light housing 204 is preferably mounted to or suspended from a ceiling or wall structure 310. The LED strip light unit includes an LED light engine 301 that is electrically coupled to an LED driver circuit 306 to power the LED light engine 301. The LED strip light unit 304 is hung onto the adjustable installation clip members 203 and 203' through the hook or lip structures 105 of the L-shaped slide plates 116 as described with reference to FIGS. 1A-C) and through the hanger edge 305 of the L-shaped protruding edge 314 of the LED strip light unit 304.

With the LED strip light unit 304 hanging from the strip light housing 204 as shown, the LED driver circuit 306 is preferably electrically coupled to existing wiring (not shown) to power the LED light engine 301. After the LED strip light unit 304 is properly wired, then LED strip light unit 304 is swung to a closed position, as indicated by the arrow 329, to engage the elongated edge 207 of the strip light housing 204 with portions of the elongated edge 207 sandwiched between the back plates 121 and spring arms 123 of the installation clip members 303 and 303'.

Figure 4A:
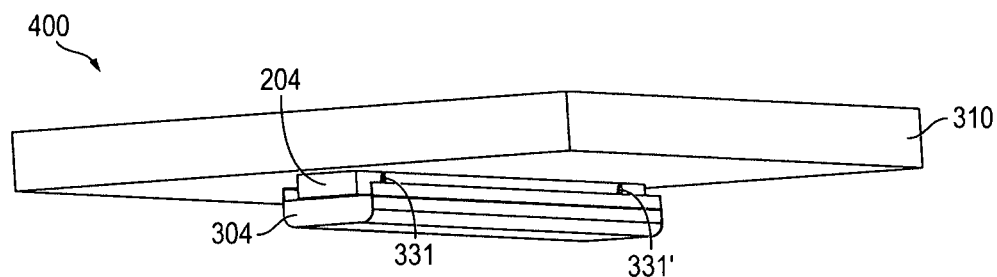
FIGS. 4A-B show securing the LED strip light unit to the strip light housing through adjustable clip members attached to LED strip light engine, such as illustrated in FIGS. 3A-B.

FIG. 4A shows a view 400 of the LED strip light unit 304 in the closed position and attached the strip light housing 204. As described above, the LED elongated rectangular strip light housing 204 is mounted to or suspended from a ceiling or wall structure 310. With the LED strip light unit 304 in the closed position as shown, threaded screw members 331 and 331', such as the threaded screw member 131 shown in FIG. 1D, are tapped through portions of the edges of the elongated side 207 that are sandwiched between back plates 121 and spring arms 123 to secure the LED strip light unit 304 to the elongated rectangular strip light housing 204.

Figure 4B:
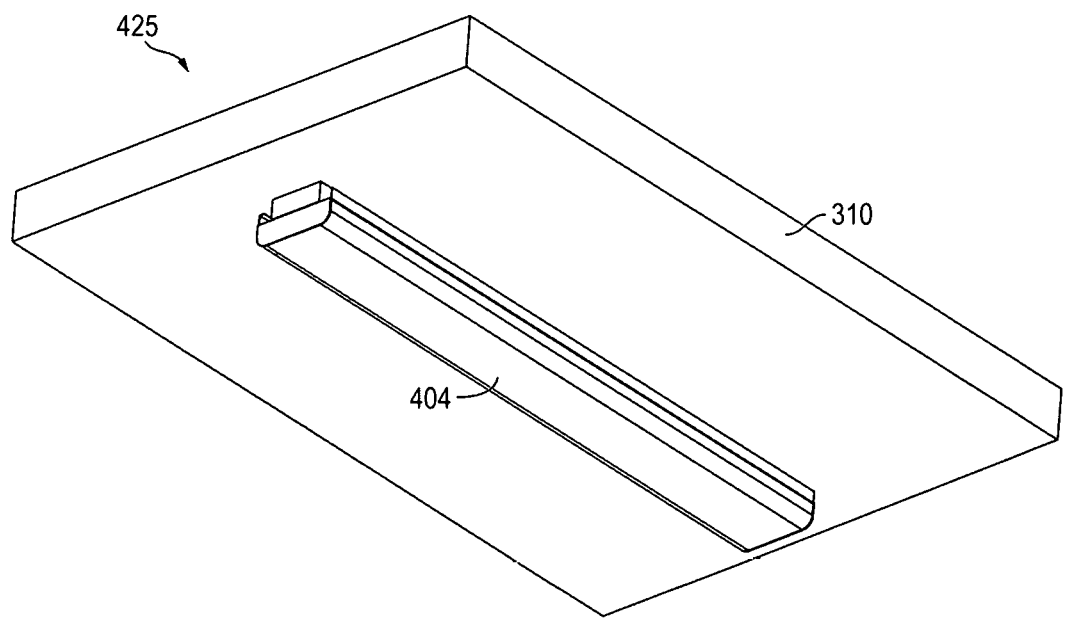

FIG. 4B shows a view 425 of completely installed strip light LED conversion system 404 of the present invention mounted to or suspended from a ceiling of wall structure 310. The adjustable installation clip members 203, 203', 303 and 303' can used to install strip light LED conversion system, allows fluorescent strip light fixtures having strip light housings with range of widths $W_1$ (FIG. 2A) to be converted with the same the same strip light LED conversion system 404 of the present invention. It will be clear to one skilled in the art that the adjustable installation clip members 203, 203', 303 and 303' to be secured to edges of existing strip light housings using any suitable method including, but not limited to, screws, bolts, pins, snap or clip features and the like.

The present invention has been described in terms of specific embodiments incorporating details to facilitate the understanding of the principles of construction and operation of the invention. For example, the strip light LED conversion system to be used to convert fluorescent strip lights haves any number of widths and lengths. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A LED strip light conversion system comprising adjustable installation clip members each having:
   a) an L-shaped slide plate with a hook or lip structure that extends upward in a perpendicular fashion up from a bottom portion of the L-shaped slide plate; and
   b) a clip structure that is slidably coupled to the bottom portion of the L-shaped slide plate, each clip structure having:
      1) a back plate that extends upward in a perpendicular fashion up from a base portion the clip structure and substantially parallel with the hook or lip structure; and
      2) an spring arm that extend upward from the base portion of the clip structure and is capable of being displaced away from the back plate structure to sandwiched a portion of an elongated edge of an strip light housing there between.

2. The LED strip light conversion system of claim 1, wherein the back plate also includes a screw hole to receive a threaded screw member to secure the clip structure to the portion of the elongated edge that is sandwiched between the back plate and the spring arm.

3. The LED strip light conversion system of claim 1, wherein the clip structure is secured to the bottom portion of the L-shaped slide plate through a threaded lock screw passing through the base portion the clip structure.

4. The LED strip light conversion system of claim 1, further comprising an LED strip light unit with an LED light engine and an LED driver circuit for powering the LED light engine.

5. The LED strip light conversion system of claim 4, wherein the LED strip light unit has an elongated L-shaped protruding edge with and elongated hanger edge for hanging the LED strip light unit from adjustable installation clip members attached to a elongated rectangular strip light housing.

6. A LED strip light conversion system comprising adjustable installation clip members each having:
   a) an L-shaped slide plate with a hook or lip structure that extends upward in a perpendicular fashion up from a bottom portion of the L-shaped slide plate; and
   b) a clip structure that is slidably coupled to the bottom portion of the L-shaped slide plate, each clip structure having:
      1) a back plate that extends upward in a perpendicular fashion up from a base portion the clip structure and substantially parallel with the hook or lip structure; and
      2) an spring arm that extend upward from the base portion of the clip structure and is capable of being displaced away from the back plate structure, wherein at least two adjustable installation clip members are attached to a first elongated edge of a strip light housing with a portion of the first elongated edge sandwiched between the back plate and the spring arm and the hook or lip structure extends outward and upward from the portion of the elongated edge; and
   c) LED strip light unit with LED strip light unit has an elongated L-shaped protruding edge with an elongated hanger edge for hanging the LED strip light unit from the at least two adjustable installation clip members that are attached to the elongated edge of the strip light housing, the LED strip light unit further comprising at least two adjustable installation clip members attached to an inner elongated surface that is opposed to the elongated L-shaped protruding edge for attaching to a second and opposed elongated edge of the strip light housing with portions of the second and opposed elongated edge sandwiched between the back plate and the spring arm.

7. The LED strip light conversion system of claim 6, wherein the back plate of each of the adjustable installation clip members also includes a screw hole to receive an attaching means for securing the clip structure to the portions of the first elongated edge and the second and opposed elongated edge sandwiched between the back plate and the spring arm.

8. The LED strip light conversion system of claim 6, wherein the clip structure of each of the adjustable installation clip members is secured to the bottom portion of the L-shaped slide plate structure through a threaded lock screw passing through the base portion the clip structure.

9. The LED strip light conversion system of claim 6, wherein the LED strip light unit further includes an LED light engine and an LED driver circuit for powering the LED light engine.

* * * * *